United States Patent
Hariharan et al.

(10) Patent No.: US 7,159,108 B2
(45) Date of Patent: Jan. 2, 2007

(54) ANONYMOUS PEER-TO-PEER NETWORKING

(75) Inventors: Rajaraman Hariharan, Chennai (IN); Ramakrishnan Kannan, Trichirapalli (IN)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 10/264,648

(22) Filed: Oct. 4, 2002

(65) Prior Publication Data

US 2004/0068647 A1   Apr. 8, 2004

(51) Int. Cl.
*G06F 1/24* (2006.01)
(52) U.S. Cl. .............. 713/153; 713/160; 713/161; 713/168
(58) Field of Classification Search ............ 713/153, 713/160, 161, 168, 200, 201
See application file for complete search history.

(56) References Cited

U.S. PATENT DOCUMENTS 5,761,706 A * 6/1998 Kessler et al. ............ 711/118
5,809,529 A * 9/1998 Mayfield ................... 711/137
5,958,040 A * 9/1999 Jouppi ....................... 712/207
6,260,115 B1 * 7/2001 Permut et al. ............. 711/134

OTHER PUBLICATIONS

"Crowds: Anonymity for Web Transactions", Michael K. Reiter and Ariel D. Rubin, AT&T Labs—Research, ACM Transactions on Information and System Security, vol. 1, No. 1, Nov. 1998, pp. 66-92.

* cited by examiner

*Primary Examiner*—Thomas Peeso
(74) *Attorney, Agent, or Firm*—Anthony V. S. England; T. Rao Coca (57) ABSTRACT

An anonymous peer-to-peer network has a security protocol that allows hosts in the network to determine whether data received from the network is valid. The requesting host can explicitly determine the data transfer route in packet header information. Each host address on route is encrypted with a public key of a directly preceding host. Consequently, the requesting host can exclude from the data transfer route any host through which the requesting host does not wish to route data. Error detecting codes are used to validate the transmitted data.

35 Claims, 6 Drawing Sheets

ANONYMOUS PEER-TO-PEER NETWORKING

FIELD OF THE INVENTION

The present invention relates anonymous peer-to-peer networking. More specifically, the invention relates to data security and validation in anonymous peer-to-peer networks.

BACKGROUND

Consider a set of computers capable of transmitting data between each other. Peer-to-peer data transfer can occur between any two computers on this network. A host is defined as any computer on the network.

To obtain data from a host in the network, a request is made to the destination host, which sends the requested data to the host that requested the data. If, for any reason, the requesting host wants to conceal its identity, the requesting host can send the request through a proxy server. The proxy server obtains the requested data from the destination host, conceals the identity of the requesting host, and passes the request onto the requesting host. The anonymity of the requesting host is thus maintained.

If the security of the proxy server is compromised, all transactions that are processed by the proxy server may be monitored. Hence, any transaction can no longer be considered anonymous. This difficulty can be obviated by making each intermediate host act as a proxy for the other hosts. The requesting hosts no longer ask for information directly from the destination, but routes the request through a chain of intermediate hosts. Any intermediate host may send a request directly to the required destination, or route the request through other intermediate hosts.

The path taken by the request is essentially random, and the number of hops in the data route is variable. Even the host on the first hop cannot be sure of the identity of the requesting host, as a distinction cannot be made between an intermediate host and a requesting host. Consequently, the requesting host's anonymity is maintained.

A protocol that implements the above-described scheme for user anonymity in peer-to-peer networking has been developed as a research project of AT&T, under the name of "crowds". A relevant publication is "Crowds: Anonymity for Web Transactions", Michael K. Reit and Ariel D. Rubin, AT&T Labs—Research.

This security protocol for user anonymity in peer-to-peer networking raises the following concerns:

(i) The requesting host cannot determine if any data that the requesting host receives is genuine. A possibility exists of data being manipulated by intermediate hosts, and the requesting host is unable to detect any such possible data manipulation.

(ii) The route of requesting data cannot be determined by the requesting host, and is always random to any intermediate host. Consequently, a "best route" cannot be selected by the requesting host. Further, any host that is suspected to be compromised cannot be explicitly skipped.

(iii) Anonymity of the end-host that services the request is not maintained, which permits traffic monitoring in the network.

A view of the above observations, a need clearly exists to address limitations in existing anonymous peer-to-peer routing protocols.

SUMMARY

A described security protocol addresses certain limitations of existing anonymous peer-to-peer routing protocols. In some existing protocols, certain transmitted fields assume a relatively small subset of values. When such a subset of values is known, and the public key used to encrypt the field values is also known, the encrypted value can be deduced through trail and error comparison of encrypted values. To avoid this type of attack, the described protocol proposes an encoding mechanism that rearranges transmitted data, to effectively strengthen the encryption mechanism, as described herein.

Hosts that service data requests, and all intermediate hosts that route the data request, are unaware or unsure of the identify of the host that made the request. The requesting host can explicitly determine the data transfer route. Consequently, the requesting host can exclude from a data transfer route any host through which the requesting host does not wish to route data. Accordingly, data need not pass through any host that the requesting host suspects may be compromised.

The described network security protocol for use by anonymous peer-to-peer networks enables data integrity to be checked, while maintaining user anonymity. The data request, and the data response, are routed through various intermediate hosts, and any manipulation of the data request or data response by any intermediate host can be identified. Anonymity and data integrity validation are established through the use of public and private key pairs.

Error detecting codes are used in the described protocol to validate data integrity. Error detecting codes, as described herein, are not specifically used for detecting transmission errors. Instead, error detecting codes are used to validate data integrity against manipulation by an intermediate participating host 140. Reference herein to CRC refers not only to cyclic redundancy checking, but is to be read as embracing any other suitable error detection mechanism.

DETAILED DESCRIPTION

A network security protocol is described for determining whether data transmitted in an anonymous peer-to-peer network is valid. A representative network topology is introduced, followed by described procedures involved in network processes.

Network Topology

Figure 1:
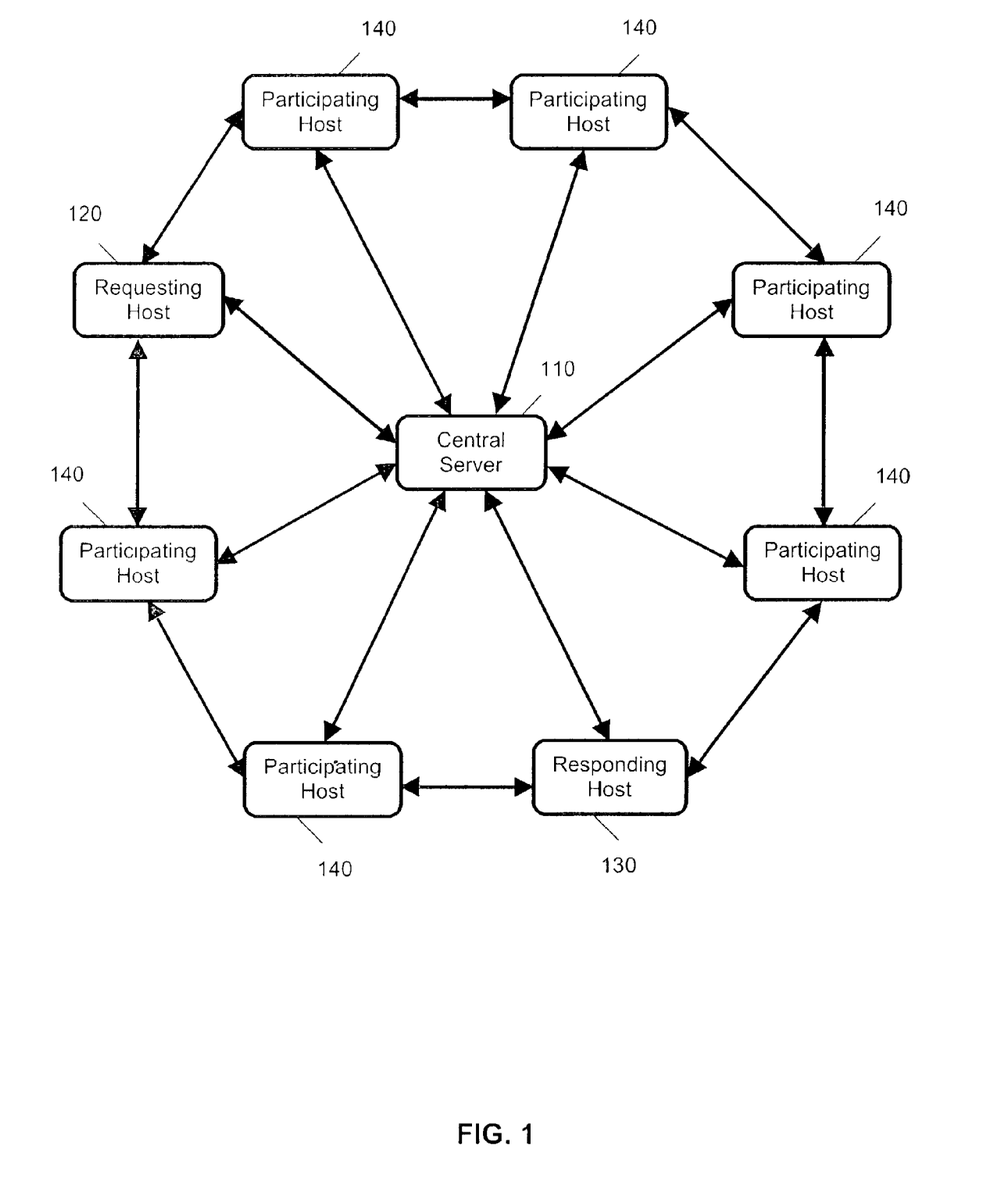
FIG. 1 is a schematic representation of a simplified network topology of an anonymous peer-to-peer network, incorporating a central server.

FIG. 1 schematically represents a network comprising a central server 110, a requesting host 120 a responding host 130, and participating hosts 140. The network topology is simplified in that only adjacent participating hosts 140 are represented as connected. Actual network topologies are more complicated, and generally involve participating hosts 140 being connected to all other participating hosts 140.

The central server 110 is required to coordinate the pool of hosts. The central server 110 registers new hosts, informs hosts 140 about newly registered hosts 140, and maintains a list of host 140 in the host pool, and a table of their corresponding public keys.

Participating hosts 140 act as routers/proxies for anonymous data transfers in the network. Requesting host 120, referred to herein as initiator 120, requests data over the network. The responding host 130, also referred to herein as end-host 130, services requests and transmits requested data to the initiator 120 through the network. Any given computer system constituting a host may act as a requesting host 120, an end-host 130 or a participating host 140. Such functionality may be provided simultaneously, depending on network transactions in which a host is involved.

The described protocol requires that all hosts 140 register with the central server 110. The protocol uses public/private key encryption techniques to facilitate operation of the protocol. A host that wishes to join the pool of hosts 140 sends its public key to the central server 110. The central server 110 stores a centralized table of public keys for the entire network. Public keys of any host 140 in the pool can be obtained from the central server 110. The central server 110 is used as a lookup database for participating hosts 140 and their public keys.

Once a host 140 is registered with the central server 140, the new host 140 is sent a confirmation message and this new host 140 may henceforth participate in data transactions. Every host 140 can locally cache the public key of other hosts 140. Public keys that are not available locally can be obtained from the central server 110 when required.

Data requests in the network are executed in a manner that conceals the identity of the initiator 120 and the end-host 130. Further, the only way to reach the end-host 130 is through the route specified by the initiator 120.

The data route is specified as follows. Hosts 140 on the data route can decrypt only the address of the very next host 140 on the data route, and forward data to that decrypted host address. A data packet finally reaches an end-host 130. The end-host 130 "knows" that it is the end-host 130 as no forwarding address of the packet is specified in the packet header.

The end-host 130 then responds to the data request. The request packet contains the CRC of the request packet. The responding host 130 calculates the CRC of the request packet the responding host 130 receives. If this calculated value of CRC matches with the CRC specified in the request packet, then the received packet is valid. If these values do not match, the responding host 130 concludes that this mismatch represents a validation error.

Any modification to the request packet result in a validation error, and can be identified at the end-host 130. If the end-host 130 identifies a validation error, the end-host 130 returns a "junk" response, to notify the initiator 120 of the error.

Data from the end-host 130 passes back to the initiator 120 in the same path as the data arrived at the end-host 130 from the initiator 120. The end-host 130 watermarks validation flags in the data stream that is sent to the initiator 120.

The validation data sent by the initiator 120 contains the offset in the stream where the watermark is placed. This makes the watermark location appear random, and encryption of this validation data makes the job of the intermediate hosts 140 effectively impossible to detect and manipulate.

The watermark typically includes an error detection check to verify data integrity. The response packet contains the CRC of the response packet. The requesting host 120 calculates the CRC of the response packet the requesting host 120 receives. If this calculated CRC value matches with the CRC specified in the response packet, then the received packet is valid. If these values do not match, the requesting host 120 concludes that this mismatch represents a validation error. Any modification to the data leads to a validation error, and can be identified by the initiator 120. The initiator 120 can discard the data, if the validation of the response data fails.

Packet Formats

Table 1 provides an example format of a request packet used in the described security protocol, and Table 2 provides an example format of a response packet. These example packet formats are described with reference to the security protocol described herein.

The terms "encoding" and "decoding" can be considered for present purposes as equivalent to corresponding respective terms "encrypting" and "decrypting". A distinction exists, however, as is explained below.

TABLE 1

```
Request Stream {
    structure REQUEST_HEADER{
        Encoded_Addr [no_of_hops_to_destination + 1]
        Encoded with final destination's public key {
            REQUIRED_VALIDATION_FLAG
            OFFSET
            PAD_SIZE
            CRC_REQUIRED
            CRC_of_REQUEST
        }
        <<pad data>>
    }
    <<actual data request>>
}
where,
Encoded_Addr[no_of_hops_to_destination + 1]    ------>
                                                Addresses of
                                                hosts on
                                                data route,
                                                in order.
REQUIRED_VALIDATION_FLAG     ------> A encoded value that
                                     can only be decrypted by the
                                     end-host.
OFFSET    ------> The encoded offset in the response
                  stream where the validation information needs to
                  be placed
CRC_REQUIRED  ------> a flag that denotes if the
                      end-host must add a CRC to the response
                      stream
CRC_of_REQUEST ------> the encoded CRC of the request
                       packet
PAD_SIZE         ------> size of <<pad data>>
<<pad data>>     ------> random data of random size
```

TABLE 2

```
Response Stream {
    <<requested data (part 1) >>
    Encoded with private key of self {
        REQUIRED_VALIDATION_FLAG
        HAS_CRC
        CRC
    }
    <<requested data (part 2) >>
}
where,
REQUIRED_VALIDATION_FLAG    ------> Equals the value sent
                                    by the initiator and is used
                                    for confirming the integrity
                                    of the content sent by the
                                    end-host.
HAS_CRC     ------> a flag to indicate if the CRC for the
                    stream is included.
CRC         ------> the encoded CRC of the response packet.
                    Invalid/junk if HAS_CRC is false
```

Requesting Data

Part of the packet header is encoded with the public key of the end-host 130. Hence, this information is readable only by the end-host 130. This information contains some special validation responses required from the end-host 130, which are used to identify whether the transmitted response data was manipulated in transit. The validation information is decided by the initiator 120.

The initiator 120 explicitly determines a route through which data travels through the network to the end-host 130. The header contains a sequenced list of intermediate host addresses, recorded in an array Encoded_Addr [ ]. Each intermediate host's address is encoded using the public keys of the previous host on route.

For example, to send a packet via notional hosts B to C to D, a packet header contains: (i) the address of C, encoded with the public key of B; and (ii) the address of D, encoded with public key of C. B decodes address C with its own private key, and C decodes address D with its own private key.

When host B receives this request, host B decodes the next host address as C, using host B's private key. Host B is not able to correctly decode any other address in the list. Host B strips out this part of the header and forwards the rest of this header without further modification. C repeats this procedure, as do successive hosts.

Ultimately, the end-host 130 is reached. The end-host 130 decodes a special value (all zeroes) to identify itself as the final host. Even the host 140 in direct contact with the end-host 130 cannot be sure of the destination's identity, as the contacting host 140 may well be a routing host like itself.

If the address of an intermediate host 140 is encoded using the public key of the directly preceding host 140, the address of the intermediate host 140 can, with adequate resources, be decoded, if the number of hosts 140 are relatively few. To address this security concern, the described protocol uses an address encoding scheme described as follows.

Any address is represented as a pair of numbers. An address ADDR is represented as a function of two values, ADDR=f(x, y).

The function f ( ) is defined so that the conditions listed below are satisfied.

1. Any value of ADDR can be represented by choosing a value for x and a suitable value for y.
2. ADDR can be represented for any value of x by suitably selecting y.
3. The value of y can be calculated, if the values of ADDR and x are known.
4. The value of ADDR can always be reconstructed correctly from the values x and y.

The same technique for splitting a value into two values can be extended using a function: ADDR=f($x_1$, $x_2$, . . . $x_n$), where $x_1$, $x_2$, . . . , $x_n$ are n values.

In this case, the function f( ) is defined in accordance with the following corresponding observations.

1. Any value of ADDR can be represented by choosing a value for $x_1$, . . . , $x_{(n-1)}$) and a suitable value for $x_n$.
2. ADDR can be represented for any values of $x_1$, . . . , $x_{(n-1)}$) by suitably selecting $x_n$.
3. The value of $x_n$ can be calculated if the value of ADDR and the values of $x_1$, . . . , $x_{(n-1)}$ are known.
4. The value of ADDR can be reconstructed correctly from the values $x_1$, . . . , $x_n$ Though a high value of n can make decoding the value of ADDR difficult, this high value of n also increases the number of values required to represent a field, and hence the amount of data that needs to be transmitted for each field.

Though the protocol specification described herein does not specify the function f( ) or the value of n, a set of interoperating hosts 140 necessarily uses the same function f( ). A suitable choice of function f( ) may be, for example, an XOR function. For n=2, this leads to ADDR=x XOR y. For each values of ADDR, and a given values of x, a unique value of y results. In this case, y=ADDR XOR x. An XOR function can also be suitably used for values of n greater than 2.

The value of n is desirably either 2 or 3. However, the value of n is assumed to never equal 1. In the purposes of the following description, n is assumed to be 2, and the values split up from a field as x and y.

A distinction is drawn at this point between use herein of the terms encoding and encryption. Encoding, as used herein, involves steps of:

1. Splitting a field into n values using the above-described function f( ).
2. Encrypting each of these n values using an encryption key.

To encode any field, the initiator 120 selects a random value for x and calculates the value of y. As described above, the value of this field can be calculated from the values of x and y. The initiator 120 then encrypts the values x and y using the public key of the intermediate host 140. Accordingly, encoding essentially involves splitting a field using function f( ), and subsequently encrypting each of the parts of the split field using an encryption key. In the following description, the terms encoding/decoding are used to describe this procedure, with reference to as associated public/private key.

If the sizes of <<actual data request>> and <<pad data>> are known, the host 140 in direct contact with the end-host 130 (that is, the penultimate host 140) can identify the end-host 130. This is possible, as the length of the remaining data packet is the total size of: (i) <<actual data request>>, (ii) <<pad data>>, (iii) length of one encoded address, and (iv) the length of the encrypted validation data. A penultimate host 140 can determine that the next host is the end-host 130 if this calculated length is greater than or equal to the length of the remaining packet.

Assuming a case in which size of <<actual data request>> is a constant, the size of <<pad data>> is the only possible variable. The protocol also places a soft limit on the size of <<pad data>>, which can be at least as large as the length of one encoded address. If the size of <<pad data>> is less than the length of one encoded address, the anonymity of the end-host 130 may be compromised.

Hence, by using a <<pad data>> of a reasonable and random size, no host 140 on the network is sure of the identity of the end-host 130. This pad data can be meaningless and random, as this pad data is in all cases discarded by the end-host 130.

Response from End-host

The response stream contains a validation flag that is requested from the end-host 130, to ensure validity of the transmitted information. The request specifies the location in the response stream where the validation response is to be placed. The requested validation flag is a value known to both the initiator 120 and the end-host 130, but no other host 140, due to encoding.

This validation flag is encoded with the private key of the end-host 130, and sent in return with the data stream at the requested offset. This value is effectively a watermark for the transmitted data. The initiator 120 is able to decode this validation flag using the public key of the end-host 130. The hosts 140 on the data route are not able to decode the validation flag, as they are unaware of the offset in which this information is found.

If the initiator 120 requests a CRC, the end-host 130 is expected to add a CRC to the encoded information. If for any reason the end-host 130 decides not to generate or write the CRC to the stream, the end-host 130 may leave this data blank. The end-host 130 informs the initiator 120 of this condition.

The CRC that is transmitted is encoded along with the validation information. Thus the location of the CRC is known only to the initiator 120 and the end-host 130. The CRC ensures that no host 140 manipulates the data on route. Any data manipulation is detected, and causes a validation failure at the initiator 120. The initiator 120 discards this data, as there is a possibility of data manipulation by an intermediate host 140.

Further Observations

The following fields are encoded using the function $f(x_1, \ldots, x_n)$.

PAD_SIZE—The range of this field is limited and can be decrypted if the identity of the end-host 130 is guessed.

CRC of response and request—The value of CRC can be guessed if the identity of the end-host 130 and the offset (in case of a response) is guessed.

Offset—If the response packet is relatively small, the location of the validation fields in the response packet can be found if the public key of the end-host 130 is known.

CRC_REQUIRED—This field can take only two values, either true or false. This value can be guessed if the identity of the end-host 130 is guessed.

HAS_CRC—This field can take only two values, either true or false. This value can be guessed if the offset and of the end-host 130 identity is guessed.

The value of the validation flag is random, and thus need not be encoded. The security of the described protocol cannot be compromised just by knowing the validation flag. To improve security, however, a decision is made to encode this field.

Encoding of the above fields makes the task of compromising the security protocol considerably more difficult, compared with not encoding but only encrypting these fields.

Protocol Specification

The described security protocol is described in overview in the following three parts: (i) initiating a transfer, (ii) responding to a request, and (iii) validating a response.

Initiating a Transfer

The initiator 120 decides if a CRC is required in the response from the end-host 130, and notes the request packet accordingly. Each host 140 knows only the address of the next host 140. The address of the end-host 130 is unknown to intermediate hosts 140.

Assume that the data route between an initiator 120 and end-host 130 is via hosts $R_1, R_2, R_3, \ldots R_n$. The corresponding packet contains the following information:

Address of $R_2$, encoded with public key of $R_1$.

Address of $R_3$, encoded with public key of $R_2$.

Address of $R_3$, and subsequent hosts 140 to $R_{n-1}$, encoded with respective corresponding public keys.

Address of end-host 130, encoded with public key of $R_n$.

Value 0 is encoded with public key of end-host 130, which indicates to a host decoding this field that the specified end-host 130 is reached. That is, the host that decodes this field is the end-host 130.

Validation key expected—encrypted with the final host's public key.

Randomly-sized pad data.

The actual request that needs to be transmitted.

Each intermediate host 140 is able to read only the address of the next host 140, due to the encryption procedure described herein. Hence, the path taken is necessarily the route specified by the initiator 120. Each intermediate host 140 strips out the prior routing data after decoding this routing data. When the address of the next hop is zero, the current host 140 is the requested end-host 130. The end-host 130 can then proceed with decrypted the validation flag.

The validation column contains:

A key that is sent back by the end-host 130 as a signature.

Offset in the response stream at which the validation flag is placed. If the transmitted data is smaller in size than the offset required, the validation flag is appended to the end of the response stream.

A flag that is set to true if the CRC of the sent stream is placed along with the validation flag.

Length of the pad data.

The CRC error detection code for the request packet.

Responding to a Request

The end-host 130 responds with the information that the initiator 120 requestes. The validation field requested by the initiator 120 is placed in the stream at the initiator-requested location.

This validation field contains the following:

The validation flag that acts as the signature of the end-host 130.

A flag to denote if the CRC is included (if and only if the initiator 120 requested CRC).

CRC of the stream that is sent (if and only if the initiator 120 requested CRC). If the previous value is zero, this field is ignored.

This response is cascaded back to the initiator 120 along the same route, in the reverse direction. Data packets sent from the end-host 120 are forwarded without modification by every host 140 on the route.

All values in the validation field are encoded with the private key of the end-host 130.

Validating a Response

The response from the end-host 130 is validated using the VALIDATION_FLAG and CRC. To locate these values in the response stream, the offset at which these values are expected in the stream is required. The initiator 120 knows the value of the offset and the expected VALIDATION_FLAG.

The initiator 120 parses the data stream at the correct location to determine the encoded values. This parsed stream can be decoded using the public key of the end-host 130. The CRC of the stream is recalculated locally by the requesting host 120 to verify whether the calculated CRC matches with the value of the CRC sent by the end-host 130.

If any one of the above two validation checks fail, a possible manipulation of data is indicated.

The initiator 120 checks for the CRC value if, and only if, the initiator 120 requests such a check. If requested and HAS_CRC is zero, the initiator 120 cannot be sure if the data is not compromised by intermediate hosts 140. The initiator 120 either accepts or discards the data obtained from the end-host 130, at the discretion of the initiator 120.

Algorithm Implementation

An algorithm implementation of the described security protocol is now described with reference to FIGS. 2 to 6.

Notation

The following notation is used herein for a host XYZ. The address is denoted as XYZ-addr. XYZ-pub(xyz) is the value of xyz encoded with the public key of XYZ. XYZ-pri (xyz) is the value of xyz encoded with the private key of XYZ.

Request from Initiator

A data route is conveniently specified as initiator 120 self→$R_1$→$R_2$→ . . . $R_n$→end-host 130. For such a route, the corresponding address array is presented in Table 3.

TABLE 3

{$R_1$-pub($R_2$-addr)}, {$R_2$-pub($R_3$-addr)},

. . . ,

{$R_n$-pub(end-host-addr)}, {end-host-pub(0)}

Figure 2:
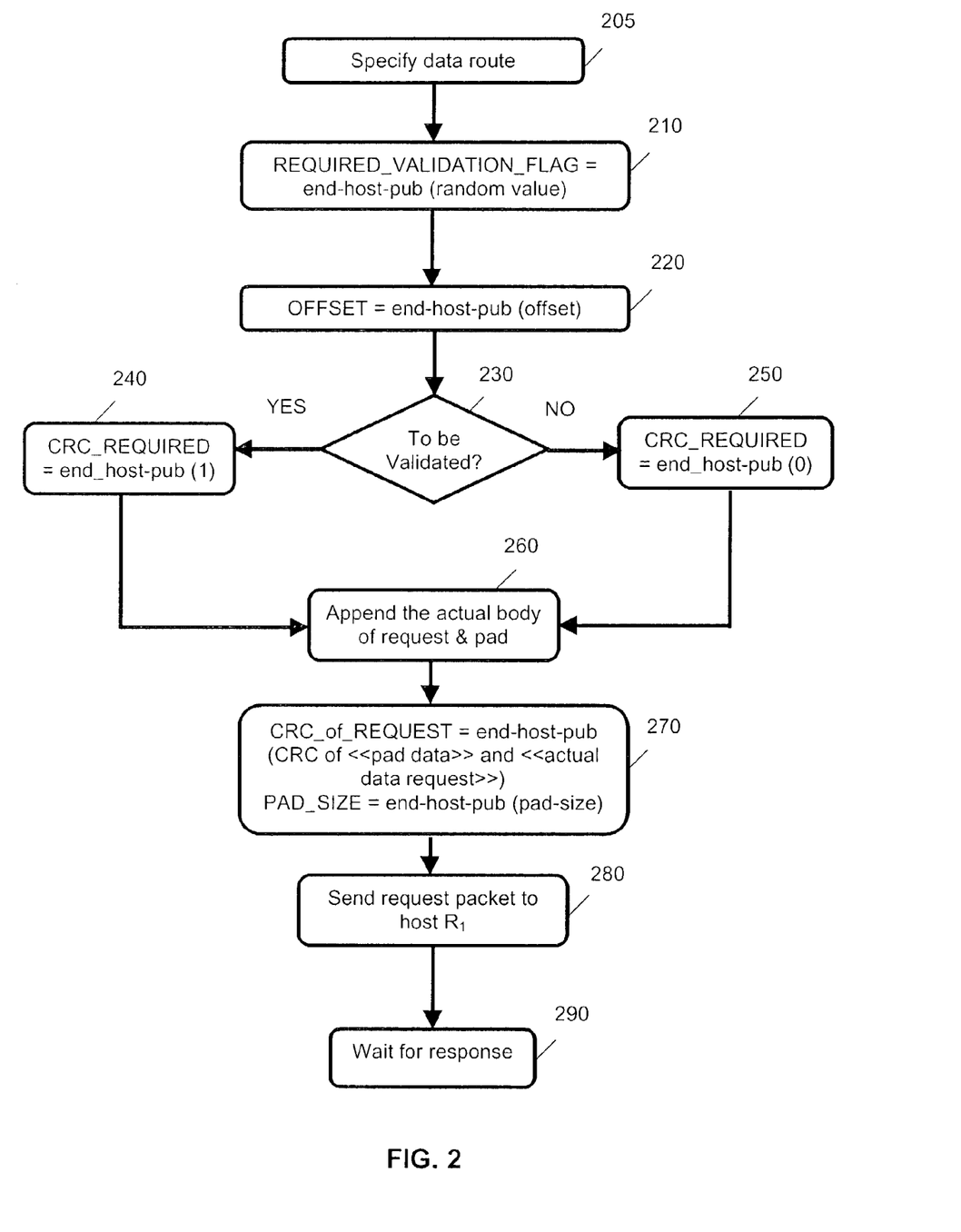
FIG. 2 is a flowchart representing steps involved in generating a request in the requesting host in the network of FIG. 1.

FIG. 2 flowcharts steps involved in creating the request packet in the initiator 120. All these steps are performed at the initiator 120. These steps are described below with reference to the correspondingly numbered steps of FIG. 2.

| | |
|---|---|
| Step 205 | Specify the data route in the manner described directly above in relation to Table 3. |
| Step 210 | Set REQUIRED_VALIDATION_FLAG = end-host-pub (random value). The validation flag is a random value encoded with the public key of the end-host 130. |
| Step 220 | Set OFFSET = end-host-pub (offset). The offset that is encoded with the public key of the end-host 130 is the offset in the response data stream at which validation information is expected. If data integrity is not to be validated, proceed to step 250. |
| Step 230 | A determination is made whether the integrity of the response is to be validated, after receiving the response. If data integrity is to be validated, proceed to step 240. If data integrity is not to be validated, proceed to step 250. |
| Step 240 | Set CRC_REQUIRED = end-host-pub (1). The CRC_REQUIRED field is assigned a value of "1", encoded with the public key of the end-host 130. |
| Step 250 | Set CRC_REQUIRED = end-host-pub (0). The CRC_REQUIRED field is assigned a value of "0", encoded with the public key of the end-host 130. Fill in the data of random size, <<pad data>> to complete the REQUEST-HEADER. The size of <<pad data>> is represented as pad-size. The value of pad-size should be reasonably large. The random size is added to the request header, to make the request header complete. |
| Step 260 | Add actual body of request, <<actual data request>>, to the end of the REQUEST_HEADER. |
| Step 270 | Set CRC_of_REQUEST = end-host-pub (CRC of the <<pad data>> and <<actual data request>> together). The CRC error detection code of the request is assigned the value of the CRC of the pad data and the actual data request, encoded with the public key of the end-host 130. Set PAD_SIZE = end-host-pub (pad-size), where pad-size is the length of <<pad data>>. |
| Step 280 | Send the request packet to host $R_1$, to be forwarded through the network to the end-host 130 along the data route specified by the packet header. |
| Step 290 | Wait for response from the end-host 130 (that is, intermediate host R1). |

Receiving a Packet

Figure 3:
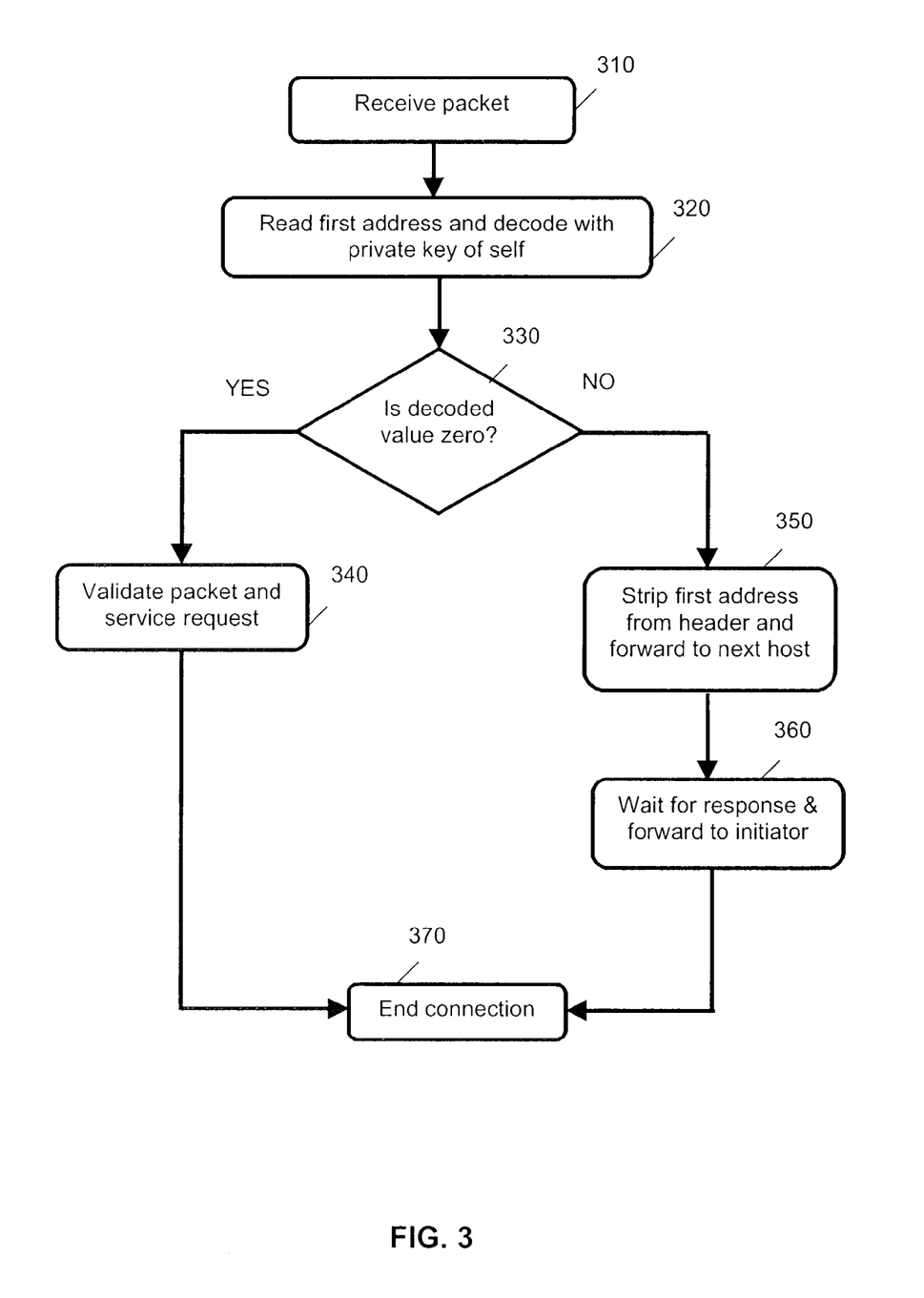
FIG. 3 is a flowchart representing steps involved in receiving a packet in the network of FIG. 1.

FIG. 3 flowcharts steps involved in receiving a packet at an intermediate host 140 or end-host 130. These steps are described below with reference to the corresponding numbered steps of FIG. 3.

| | |
|---|---|
| Step 310 | Receive a request packet, having a packet structure the example packet structure of in accordance with Table 1. |
| Step 320 | Read first encoded address. The host 140 that receives the packet uses its private key to decode this address. |
| Step 330 | Determine whether value is next address. If the decoded value is zero, the host 140 is the end-host 130. Accordingly, proceed to step 340. If not equal to 0, assume this value is the next hop address. Perform step 350. |
| Step 340 | Reply to initiator 120 with encoding, and proceed to step 370. |
| Step 350 | Strip the first encoded address from the packet header and send the modified packet to the host 140 at the next hop address. |
| Step 360 | Wait for response, and forward the response packet to the host (initiator 120 or intermediate host 140) that sent the request packet. |
| Step 370 | End connection. |

Replying to a Request

Figure 4:
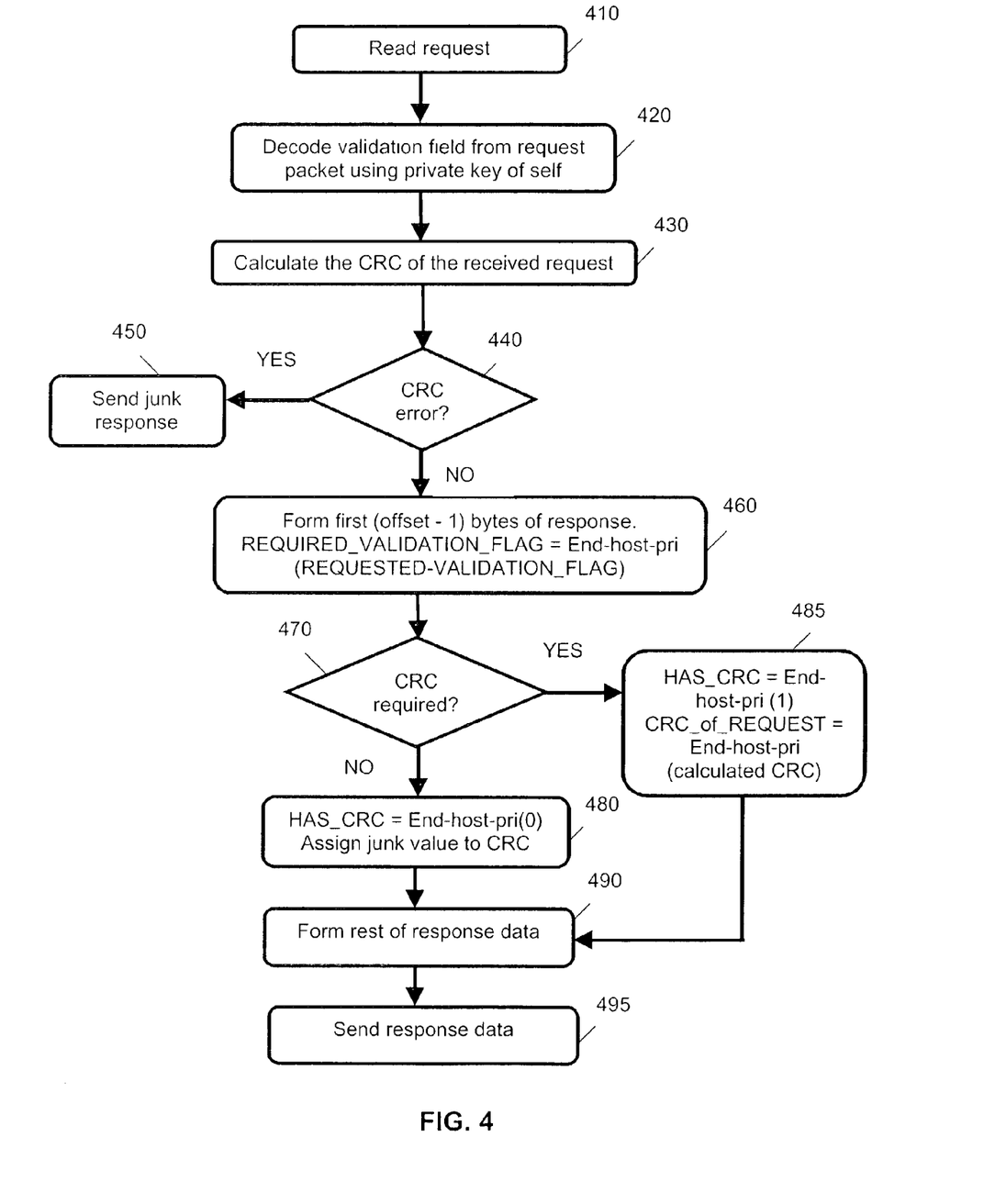
FIG. 4 is a flowchart representing steps involved in replying to a request from a requesting host in the network of FIG. 1.

FIG. 4 flowcharts steps involved an end-host 130 in replying to a request from an initiator 120. These steps are described below with reference to the correspondingly numbered steps of FIG. 4.

| | |
|---|---|
| Step 410 | Read the complete request. |
| Step 420 | Decrypt parameters from the request packet, namely {REQUIRED_VALIDATION_FLAG, OFFSET, CRC_REQUIRED, CRC_of_REQUEST}, using the private key of the end-host 130 (self). |
| Step 430 | Calculate the CRC error detection code of the received request. |
| Step 440 | If the calculated CRC is different from the value of the decoded CRC, (that is, CRC-of-REQUEST) perform step 450. If the calculated CRC agrees with the value of the decoded CRC (that is, CRC-of-REQUEST), perform step 460. |
| Step 450 | Send a junk response and end the response. The initiator 120 interprets this junk response as an error. |
| Step 460 | Form the first (offset − 1) bytes of the response. If there is less than (offset −1) bytes of data to be sent in the response stream, append the validation data to the end of the response stream. Also, set REQUIRED_VALIDATION_FLAG = END-host- pri (REQUIRED_VALIDATION_FLAG). The operand validation flag is taken from the request packet from the initiator 120. |

-continued

| Step 470 | Determine if CRC_REQUIRED is true. If CRC_REQUIRED is true perform step 485. If CRC_REQUIRED is not true, and thus no CRC is required, perform step 480. |
|---|---|
| Step 480 | Assign HAS_CRC = $R_n$-pri (0), and assign some junk value to CRC. |
| Step 485 | Set HAS_CRC to true and set CRC_of_REQUEST to the CRC of the total response packet that is to be sent. Assign HAS_CRC = End-host-pri (1). CRC_of_REQUEST = End-host-pri (calculated CRC). |
| Step 490 | Form the rest of the response data. |
| Step 495 | Send the response data and end response. |

Initiator Receives a Response

Figure 5:
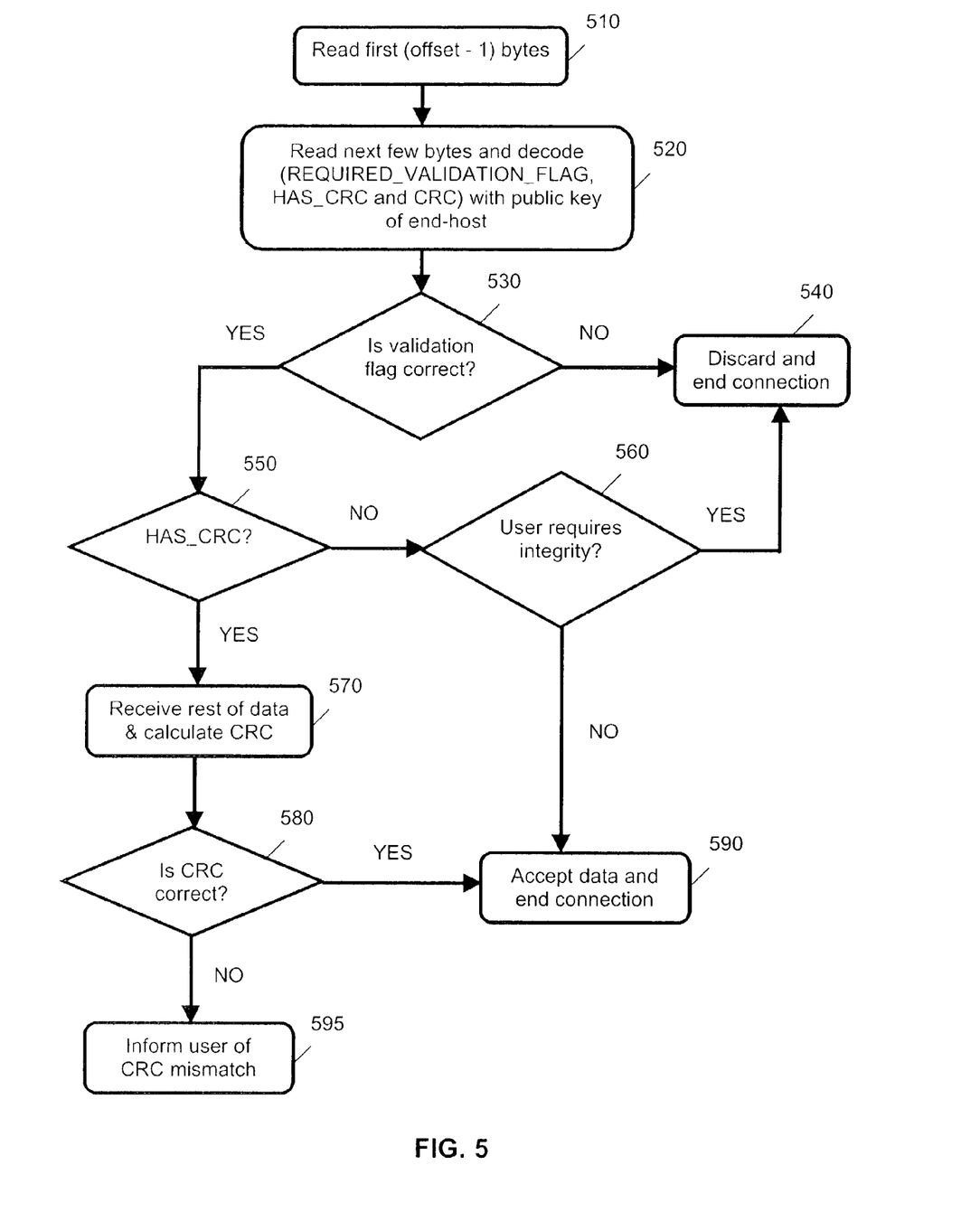
FIG. 5 is a flowchart representing steps involved in receiving a response from a responding host in the network of FIG. 1.

FIG. 5 flowcharts steps involved in the initiator 120 receiving a response from the end-host 130. These steps are described below with reference to correspondingly numbered steps of FIG. 5. An initiator 120 is aware of the values of REQUIRED_VALIDATION_FLAG, HAS_CRC, OFFSET as sent in the request header from the initiator 120 to the end-host 130.

| Step 510 | Read first (offset −1) bytes from the response data stream. If there is not (offset −1) bytes of data in the response stream, the last few bytes are taken to be validation data used in step 520. |
|---|---|
| Step 520 | Decode three entries (namely REQUIRED_VALIDATION_FLAG, HAS_CRC and CRC) from the respose stream using the public key of the end-host 130. |
| Step 530 | Determine whether the REQUIRED_VALIDATION_FLAG decrypted from the end-host 130 is different from the REQUIRED_VALIDATION_FLAG sent in the request. If the validation flags agree, proceed to step 550. If a mismatch exists, proceed to step 540. |
| Step 540 | Discard the data as invalid, and end the connection. |
| Step 550 | Determine the status of HAS_CRC. If HAS_CRC is true (that is, logical one), proceed to step 570. If HAS_CRC is false, proceed to step 560. |
| Step 560 | Determine whether a user requires data integrity. If the user does not require data integrity, proceed to step 590. If the user does requires data integrity, proceed to step 540. |
| Step 570 | Receive the rest of the data, and calculate the CRC of the received data (excluding the validation data). |
| Step 580 | Determine whether the CRC received and the calculated CRC match. If the two CRCs agree, proceed to step 590. If a mismatch exists, proceed to step 595. |
| Step 595 | Notify the user that the content received may not be genuine. |
| Step 590 | Accept the data and end the connection. |

Security Analysis

The following analysis assumes that the initiator 120 requests error detection in the response, and that the requested code is supplied by the end-host 130 in the response. If error detection code is not interchanged, the described protocol cannot guarantee a means for validating data integrity.

Case 1: Malicious Participating Host

Any data that goes through a malicious participating host 140 can be read. These packets cannot be decoded fully, as critical parts of the packets are encrypted. Manipulation of any packet can be identified using the validation check at the end-host 130 or initiator 120.

To use the data routed through a malicious participating host 140 for any purpose, the validation data contained in the data must be removed. This is not possible as the location is unknown.

Case 2: Group of Malicious Hosts Operating Together

Each host 140 can trap only data transfers that are routed through that host 140. As a group, more transactions can be caught. In any case, all data is encoded, and comments made in relation to "case 1" apply.

Case 3: Malicious End-Host

The described protocol does not address the case in which the end-host 130 sends malicious information to the initiator 120. However, the anonymity of the initiator 120 is maintained so the motivation of any such attack is uncertain.

Case 4: Malicious Central Server

The central server 110 is the repository of associated public and private key pairs. All data requests are routed through predetermined routes, and the central server 110 has no part in transferring data.

The central server 110 can, however, supply incorrect public or private keys, either always or intermittently. In either case, the protocol does not function if incorrect keys are supplied as the intermediate hosts 140 wrongly decrypt the request header. The initiator 120 receives data that is discarded, as validation information is incorrect.

If incorrect keys are supplied by the central server 110 intermittently, data requests amongst hosts 140 selectively fail. Consequently, no data transfer occurs. In any case, the initiator 120 does not accept manipulated data. Further, the identity of the initiator 120, and the identity of the end-host 130 is not revealed.

A further scenario is that the central server 110 tracks the initiator 120, data transfer route and/or the end-host 130 by simply tracking the public keys requested by hosts 140.

This potential problem is obviated by an appropriate implementation. The implementation could, for instance, request public keys of additional hosts 140 that the host 140 does not plan to use. Hosts 140 can also request keys for all other hosts 140, and use the locally-cached public keys whenever appropriate.

Computer Hardware and Software

Figure 6:
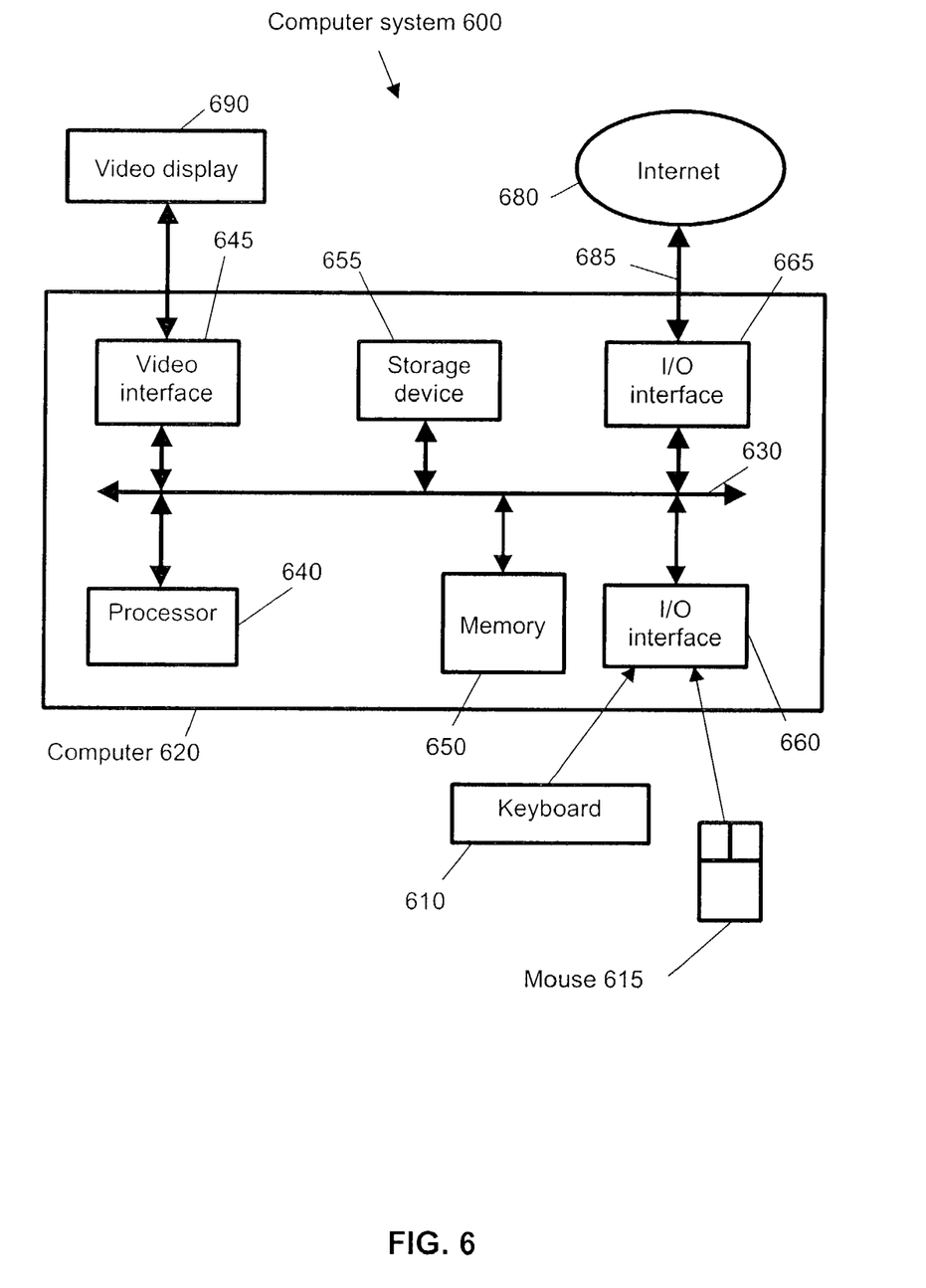
FIG. 6 is a schematic representation of a computer system suitable for performing techniques described with reference to FIGS. 1 to 5.

FIG. 6 is a schematic representation of a computer system 600 that can be used to perform steps in a process that implement the techniques described herein. The computer system 600 is provided for executing computer software that is programmed to assist in performing the described techniques. This computer software executes under a suitable operating system installed on the computer system 600.

The computer software involves a set of programmed logic instructions that are able to be interpreted by the computer system 600 for instructing the computer system 600 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 600 include: a computer 620, input devices 610, 615 and video display 690.

The computer 620 includes: processor 640, memory module 650, input/output (I/O) interfaces 660, 665, video interface 645, and storage device 655.

The processor 640 is a central processing unit (CPU) that executes the operating system and the computer software executing under the operating system. The memory module 650 includes random access memory (RAM) and read-only memory (ROM), and is used under direction of the processor 640.

The video interface 645 is connected to video display 690 and provides video signals for display on the video display 690. User input to operate the computer 620 is provided from input devices 610, 615 consisting of keyboard 610 and mouse 615. The storage device 655 can include a disk drive or any other suitable non-volatile storage medium.

Each of the components of the computer 620 is connected to a bus 630 that includes data, address, and control buses, to allow these components to communicate with each other via the bus 630.

The computer system 600 can be connected to one or more other similar computers via a input/output (I/O) interface 665 using a communication channel 685 to a network 680, represented as the Internet.

The computer software program may be provided as a computer program product, and recorded on a portable storage medium. In this case, the computer software program is accessed by the computer system 600 from the storage device 655. Alternatively, the computer software can be accessed directly from the network 680 by the computer 620. In either case, a user can interact with the computer system 600 using the keyboard 610 and mouse 615 to operate the programmed computer software executing on the computer 620.

The computer system 600 is described for illustrative purposes: other configurations or types of computer systems can be equally well used to implement the described techniques. The foregoing is only an example of a particular type of computer system suitable for implementing the described techniques.

Conclusion

A protocol, a network, a data packet and computer software are each described herein in the context of an improved manner of anonymous communication in a peer-to-peer network.

Modified implementations of the described algorithms are possible. For example, a modified implementation may receive the complete request or response packet before validating any information the packet contains.

The described protocol does not have any inherent mechanism to identify malicious or malfunctioning hosts 140. Implementations of the protocol can be implemented with intelligence (at the data request end) to exclude suspected hosts, by explicitly selecting a route that does not contain any currently suspected hosts.

There is a possibility (though remote) that two hosts 140 may have the same public/private key pairs. In such cases, the central server 110 can be designed to advise the affected hosts 140 of this collision. The required participating hosts 140 can then change the pair of keys so that the key pairs of the two hosts are different from each other.

The protocol can be used to conceal the identities of the requesting and responding hosts, and can detect if received data is manipulated by any host on route. The protocol effectively obviates security issues associated with not knowing whether or not received data is compromised in anonymous peer-to-peer networks, when data is routed through intermediate hosts 140.

Various alterations and modifications can be made to the techniques and arrangements described herein, as would be apparent to one skilled in the relevant art.

We claim:

1. A method of transmitting packets from a requesting host to a responding host in a network, wherein the transmitting includes transmitting via a sequence of hosts, whereby hosts in the sequence have respective immediately preceding hosts, the method comprising the steps of:
   a) receiving an incoming packet by such a host in the sequence, a packet header of which contains encrypted addresses for the respective hosts in the sequence, each address being encrypted by a public key of the respective immediately preceding host; and
   b) decrypting, by the host receiving the packet in step a), the address in the packet header for a next host in the sequence, wherein the decrypting uses a private key of the receiving host and the incoming packet contains padding data between the packet header and packet data.

2. The method as claimed in claim 1, wherein a packet from a requesting host contains a validation flag encrypted with a public key of a responding host.

3. The method as claimed in claim 1, wherein the padding data is random in length and an encrypted value of this length is contained in the packet header.

4. The method as claimed in claim 1, comprising the step of selecting a predetermined data route to avoid a particular host.

5. A method of transmitting packets from a requesting host to a responding host in a network, wherein the transmitting includes transmitting via a sequence of hosts, whereby hosts in the sequence have respective immediately preceding hosts, the method comprising the steps of:
   a) receiving an incoming packet by such a host in the sequence, a packet header of which contains encrypted addresses for the respective hosts in the sequence, each address being encrypted by a public key of the respective immediately preceding host; and
   b) decrypting, by the host receiving the packet in step a), the address in the packet header for a next host in the sequence, wherein the decrypting uses a private key of the receiving host and the addresses are decomposed into discrete values $(x_1, x_2, \ldots x_n)$ prior to encryption, such that each address is represented as a function of these discrete values $(f(x_1, x_2, \ldots X_n))$.

6. A method for verifying data integrity in a network, the method comprising the steps of:
   receiving an incoming packet having a packet header that comprises an encrypted validation flag and an encrypted offset value;
   decrypting, using one of a public-private key pair, the encrypted validation flag and the decrypted offset value;
   encrypting, using one of a public-private key pair, the decrypted validation flag;
   inserting the newly encrypted validation flag in an outgoing packet, at an offset determined by the decrypted offset value; and
   transmitting the outgoing packet.

7. The method as claimed in claim 6, wherein the encrypted validation flag is decrypted with a private key.

8. The method as claimed in claim 6, wherein the decrypted validation flag is encrypted with a private key.

9. The method as claimed in claim 6, wherein the packet header of the incoming packet further comprises an encrypted error detecting code.

10. The method as claimed in claim 9, wherein the encrypted error detecting code is used to verify the validity of the incoming packet.

11. The method as claimed in claim 6, further comprising the step of encoding the offset value.

12. The method as claimed in claim 11, wherein said offset value is a random value.

13. The method as claimed in claim 6, wherein the validation flag and/or offset value are decomposed into discrete values $(x_1, x_2, \ldots x_n)$ prior to encryption, such that each validation flag and/or offset value is represented as a function of these discrete values $(f(x_1, x_2, \ldots x_n))$.

14. The method as claimed in claim 6, further comprising the step of receiving the outgoing packet.

15. The method as claimed in claim 14, further comprising the step of decrypting, using one of a public-private key pair, the encrypted validation flag at the offset value.

16. A computer program product for verifying data integrity in a network, wherein the computer program product resides on a computer usable medium having computer readable program code, the program code comprising:
   first instructions for receiving an incoming packet having a packet header that comprises an encrypted validation flag and an encrypted offset value;
   second instructions for decrypting, using one of a public-private key pair, the encrypted validation flag and the decrypted offset value;
   third instructions for encrypting, using one of a public-private key pair, the decrypted validation flag;
   fourth instructions for inserting the newly encrypted validation flag in an outgoing packet, at an offset determined by the decrypted offset value; and
   fifth instructions for transmitting the outgoing packet.

17. The computer program product as claimed in claim 16, the program code comprising:
   instructions for encoding the offset value.

18. The computer program product as claimed in claim 16, wherein said offset value is a random value.

19. The computer program product as claimed in claim 16, wherein the validation flag and/or offset value are decomposed into discrete values $(x_1, x_2, \ldots x_n)$ prior to encryption, such that each validation flag and/or offset value is represented as a function of these discrete values $(f(x_1, x_2, \ldots x_n))$.

20. The computer program product as claimed in claim 16, the program code comprising:
   instructions for decrypting, using one of a public-private key pair, the encrypted validation flag at the offset value.

21. A network able to verify data integrity, the network comprising:
   means for receiving an incoming packet having a packet header that comprises an encrypted validation flag and an encrypted offset value;
   means for decrypting, using one of a public-private key pair, the encrypted validation flag and the decrypted offset value;
   means for encrypting, using one of a public-private key pair, the decrypted validation flag;
   means for inserting the newly encrypted validation flag in an outgoing packet, at an offset determined by the decrypted offset value; and
   means for transmitting the outgoing packet.

22. The network as claimed in claim 21, further comprising:
   means for encoding the offset value.

23. The network as claimed in claim 21, wherein said offset value is a random value.

24. The network as claimed in claim 21, wherein the validation flag and/or offset value are decomposed into discrete values $(x_1, x_2, \ldots x_n)$ prior to encryption, such that each validation flag and/or offset value is represented as a function of these discrete values $(f(x_1, x_2, \ldots x_n))$.

25. The network as claimed in claim 21, further comprising:
   means for decrypting, using one of a public-private key pair, the encrypted validation flag at the offset value.

26. A computer program product for transmitting packets from a requesting host to a responding host in a network, wherein the transmitting includes transmitting via a sequence of hosts, whereby hosts in the sequence have respective immediately preceding hosts, and wherein the computer program product resides on a computer usable medium having computer readable program code, the program code comprising:
   first instructions for receiving an incoming packet by such a host in the sequence, a packet header of which contains encrypted addresses for the respective hosts in the sequence, each address being encrypted by a public key of the respective immediately preceding host; and
   second instructions for decrypting, by the host receiving the packet, the address in the packet header for a next host in the sequence, wherein the decrypting uses a private key of the receiving host and the incoming packet contains padding data between the packet header and packet data.

27. The computer program product as claimed in claim 26, wherein a packet from a requesting host contains a validation flag encrypted with a public key of a responding host.

28. The computer program product as claimed in claim 26, wherein the padding data is random in length and an encrypted value of this length is contained in the packet header.

29. The computer program product as claimed in claim 26, the program code comprising:
   instructions for selecting a predetermined data route to avoid a particular host.

30. A computer program product for transmitting packets from a requesting host to a responding host in a network, wherein the transmitting includes transmitting via a sequence of hosts, whereby hosts in the sequence have respective immediately preceding hosts, wherein the computer program product resides on a computer usable medium having computer readable program code, the program code comprising:
   first instructions for receiving an incoming packet by such a host in the sequence, a packet header of which contains encrypted addresses for the respective hosts in the sequence, each address being encrypted by a public key of the respective immediately preceding host; and
   second instructions for decrypting, by the host receiving the packet, the address in the packet header for a next host in the sequence, wherein the decrypting uses a private key of the receiving host and the addresses are decomposed into discrete values $(x_1, x_2, \ldots x_n)$ prior to encryption, such that each address is represented as a function of these discrete values $(f(x_1, x_2, \ldots x_n))$.

31. An apparatus for transmitting packets from a requesting host to a responding host in a network, wherein the transmitting includes transmitting via a sequence of hosts, whereby hosts in the sequence have respective immediately preceding hosts, the apparatus comprising:

processing circuitry; and a storage device communicatively coupled to the processing circuitry and having program code readable by the processing circuitry, the program code comprising instructions for causing the processing circuitry to perform:

a) receiving an incoming packet by such a host in the sequence, a packet header of which contains encrypted addresses for the respective hosts in the sequence, each address being encrypted by a public key of the respective immediately preceding host; and b) decrypting, by the host receiving the packet in step a), the address in the packet header for a next host in the sequence, wherein the decrypting uses a private key of the receiving host and the incoming packet contains padding data between the packet header and packet data.

32. The apparatus as claimed in claim 31, wherein a packet from a requesting host contains a validation flag encrypted with a public key of a responding host.

33. The apparatus as claimed in claim 31, wherein the padding data is random in length and an encrypted value of this length is contained in the packet header.

34. The apparatus as claimed in claim 31, the program code comprising instructions for causing the processing circuitry to perform:

selecting a predetermined data route to avoid a particular host.

35. An apparatus for transmitting packets front a requesting host to a responding host in a network, wherein the transmitting includes transmitting via a sequence of hosts, whereby hosts in the sequence have respective immediately preceding hosts, the apparatus comprising:

processing circuitry; and a storage device communicatively coupled to the processing circuitry and having program code readable by the processing circuitry, the program code comprising instructions for causing the processing circuitry to perform:

a) receiving an incoming packet by such a host in the sequence, a packet header of which contains encrypted addresses for the respective hosts in the sequence, each address being encrypted by a public key of the respective immediately preceding host; and b) decrypting, by the host receiving the packet in step a), the address in the packet header for a next host in the sequence, wherein the decrypting uses a private key of the receiving host and the addresses are decomposed into discrete values $(x_1, x_2, \ldots x_n)$ prior to encryption, such that each address is represented as a function of these discrete values $(f(x_1, x_2, \ldots x_n))$.

* * * * *